United States Patent
Kozawa et al.

[11] Patent Number: 5,858,532
[45] Date of Patent: Jan. 12, 1999

[54] MAGNETITE PARTICLES, MAGNETIC IRON OXIDE PARTICLES, PROCESS FOR THE PRODUCTION OF THE SAME AND MAGNETIC TONER USING THE SAME

[75] Inventors: Minoru Kozawa; Koso Aoki, both of Horoshima-ken; Hiromitsu Misawa, Hiroshima; Sigenori Miyazaki, Hiroshima-ken; Naoki Uchida, Hiroshima-ken; Kazuo Fujioka, Hiroshima-ken, all of Japan

[73] Assignee: Toda Kogyo Corporation, Japan

[21] Appl. No.: 813,207

[22] Filed: Mar. 7, 1997

[30] Foreign Application Priority Data

Mar. 7, 1996 [JP] Japan .................................. 8-081006

[51] Int. Cl.$^6$ ....................................................... B32B 5/16
[52] U.S. Cl. ................. 428/402; 428/403; 428/694 BA; 428/900
[58] Field of Search ............................ 428/403, 694 BA, 428/402, 900

[56] References Cited

U.S. PATENT DOCUMENTS 4,975,214  12/1990  Sakashita et al. .................... 252/62.59

FOREIGN PATENT DOCUMENTS

| 0 647 593 A1 | 4/1995 | European Pat. Off. . |
| 60-071529 A | 4/1985 | Japan . |
| 03121463 | 5/1991 | Japan . |
| 05345616 A | 12/1993 | Japan . |

*Primary Examiner*—H. Thi Le
*Attorney, Agent, or Firm*—Nixon & Vanderhye

[57] ABSTRACT

Magnetite particles of the present invention have an average particle diameter of 0.05 to 0.50 μm, each of the magnetite particles having a plurality of mountain-shaped protrusions with unsharpened crests on a surface of each magnetite particle, and the number of the mountain-shaped protrusions formed on the surface of each magnetite particle being in the range of 2 to 30 when viewed in projected plan; magnetic iron oxide particles for magnetic toner comprising not less than 60%, in number, of the said magnetite particles; and a magnetic toner comprising the said magnetic iron oxide particles and a binder resin. The magnetite particles of the present invention are free from the falling-off from toner particles. The toner particles of the present invention shows a good fluidity and produces visual images having a higher definition upon development of electrostatic latent images.

17 Claims, 3 Drawing Sheets

(×50000)

(×50000)

(×50000)

(×50000)

MAGNETITE PARTICLES, MAGNETIC IRON OXIDE PARTICLES, PROCESS FOR THE PRODUCTION OF THE SAME AND MAGNETIC TONER USING THE SAME

BACKGROUND OF THE INVENTION

The present invention relates to magnetite particles, magnetic iron oxide particles for magnetic toner, a process for producing the same and a magnetic toner using the same, and particularly it relates to magnetite particles, magnetic iron oxide particles for magnetic toner which are free from separation (falling-off) from toner particles, a process for producing the magnetic iron oxide particles, and a magnetic toner using the magnetic iron oxide particles, which shows a good fluidity and produces visual images having a higher definition upon development of electrostatic latent images.

As one of electrostatic latent image-developing methods, there has been widely known and generally utilized a developing method in which composite particles obtained by mixing and dispersing magnetic particles in a binder resin, without using a carrier, is used as a developer, i.e., a so-called one component magnetic toner developing method.

In recent years, accompanied with miniaturization of electrostatic copying machines and printing machines and realization of high performance such as a high speed operation thereof, there has been a strong demand for enhancing characteristics or properties of a magnetic toner as a developer, i.e., an excellent durability so as to obtain a stable developing performance even under severe use conditions. In addition, such a magnetic toner is required to have a high fluidity and produce visual images having a higher definition.

In general, the magnetic toner comprises magnetic particles and a binder resin. The magnetic particles are uniformly dispersed in respective toner particles. The magnetic particles which are exposed to a surface of each toner particle are apt to fall off from the toner particle due to frictional contact with other toner particles or the like. Especially, when the particle size of the toner is small, a large number of magnetic particles are exposed to the surface of the toner particle so that the magnetic particles are easily fallen off in the form of a fine powder from the surface of the toner particle. Such magnetic particles fallen off in the form of a fine powder cause various problems such as deterioration in environmental conditions within the copying or printing machines, disturbance of uniform triboelectric of the toner, deteriorated developability of the toner due to scattering of the magnetic particles upon the development of electrostatic latent images. For these reasons, it is intensely required to provide magnetic particles which are free from the falling-off from a surface of respective toner particles even when the magnetic particles are exposed to the toner surface, and which have an excellent durability.

With respect to the definition of visual images on the electrostatic latent image development, Japanese Patent Application Laid-open (KOKAI) No. 63-139367 (1988) describes that "in such a method using a dry developer, in order to produce visual images having a high quality, it is required that the developer exhibits a high fluidity and a uniform triboelectric property". Thus, the fluidity and uniform triboelectric property of the toner particles as a developer give a large influence on a quality of visual images produced. For this reason, a toner having a high fluidity and a uniform triboelectric property is highly required to obtain visual images having a higher definition.

Properties of a magnetic toner have a close relationship with those of magnetic particles which are mixed and dispersed in the magnetic toner. The fluidity of the magnetic toner highly depends upon a surface condition of each of the magnetic particles exposed to a surface of the magnetic toner. In this regard, as described in Japanese Patent Application Laid-open (KOKAI) Nos. 5-72801 (1993), 5-213620 (1993) and 7-101731 (1995) and the like, it is known that the magnetic particles having Si on a surface thereof enhance the fluidity of the magnetic toner.

The magnetic toner is occasionally exposed to an elevated temperature as high as not less than 150° C. during the use. Even in such a case, the magnetic toner is required to have a stable color tone.

This fact has also been described in Japanese Patent Application Laid-open (KOKAI) No. 55-65406 (1980) as "In general, the magnetic particles for such a one component magnetic toner are required to have the following properties:... iv) To have a practically usable blackness. Although a colorant can be contained in the magnetic toner, it is preferable that the particle itself has a black color without using any colorant. v) To have a high heat resistance. It is required that a color tone, especially a black color and an electromagnetic properties thereof are stable enough in the range of a temperature of 0° to 150° C.

As well known in the art, unsuitable phenomenon that a color tone of the magnetic toner turns from black to brown is caused due to the fact that a blackness of magnetite particles is varied depending upon a content of $Fe^{2+}$ and, therefore, there is a tendency that the more the content of $Fe^{2+}$, the more the magnetite particles are excellent in blackness. However, when exposed to an elevated temperature as high as 150° C., the $Fe^{2+}$ in the magnetite particles is oxidized to $Fe^{3+}$ so that magnetite is transformed into maghemite.

In addition, since the surface of the magnetic particle generally is hydrophilic, it is difficult to disperse the magnetic particles in a resin, thereby causing the difference in content of the magnetic particles between respective magnetic toner particles. As a result, the magnetic toner particles are likely to be magnetically coagulated with each other with the particles having a large content of the magnetic particles. Such magnetic particles having a hydrophilic surface have a large oil absorption.

In consequence, in order to obtain a magnetic toner capable of producing visual images having a high definition, it is required that the surface of the magnetic particle is hydrophobic and the oil absorption of the magnetic particles is small, in order to enhance a dispersibility of the magnetic particles in a resin.

As magnetite particles used as magnetic particles for a magnetic toner, there are known octahedral magnetic particles (Japanese Patent Publication (KOKOKU) No. 44-668 (1969)), spherical magnetite particles (Japanese Patent Publication (KOKOKU) No. 62-51208 (1987)), hexahedral magnetite particles (Japanese Patent Application Laid-open (KOKAI) No. 3-201509 (1991)) or the like.

There are also known magnetite particles having specific shapes, for example, magnetite particles having grain-shaped protrusions on surfaces thereof (Japanese Patent Application Laid-open (KOKAI) No. 5-345616 (1993)), polyhedral magnetite particles each having at least 10 faces on a surface thereof (Japanese Patent Application Laid-open (KOKAI) No. 5-43253 (1993)) or the like.

Hitherto, studies have been conducted with respect to processes for producing magnetite particles, which processes comprise adding Si during a reaction for the preparation thereof to improve properties of the magnetite particles. For example, there have been proposed a process for producing magnetite particles, which process comprises adding a silicon component to a ferrous salt-containing solution, mixing 1.0 to 1.1 equivalent of alkali based on Fe in the solution, thereafter carried out an oxidation reaction in the solution while maintaining the solution at a pH of 7 to 10, adding 0.9 to 1.2 equivalent of Fe based on the initially added alkali to the solution during the reaction to compensate a deficient amount of Fe, and carrying out an oxidation reaction in the solution while maintaining the solution at a pH of 6 to 10 (Japanese Patent Application Laid-open (KOKAI) No. 5-213620 (1993)), a process for producing spherical magnetite particles, which process comprises passing an oxygen-containing gas into an aqueous ferrous salt reaction solution containing ferrous hydroxide colloid obtained by reacting $Fe^{2+}$ with 0.80 to 0.99 equivalent of alkali hydroxide, wherein water-soluble silicate is added to the reaction solution in an amount of 0.1 to 5.0 atomic % (calculated as an element Si) based on Fe (Japanese Patent Publication (KOKOKU) No. 3-9045 (1991)), a process for producing magnetite pigment, which process comprises adding not less than one equivalent of an alkaline solution to a ferrous salt solution, and during the oxidation reaction of the magnetite particles after completing the preparation of ferrous hydroxide, adding a hydroxy silicate-containing solution to the reaction solution in an amount of 0.5 to 3.0% by weight (calculated as a ratio of Si to $Fe_3O_4$) at the time in which a ratio of $Fe^{2+}$ to $Fe^{3+}$ is in the range of 10 to 1.0 (Japanese Patent Publication (KOKOKU) No. 1-39864 (1989)), or the like.

There have also been proposed a process for forming a coating layer comprising a hydroxide or a hydrous oxide of Si, Al, Ti or the like to improve a heat resistance (Japanese Patent Application Laid-open (KOKAI) No. 8-133745 (1996)), a process for treating surfaces of particles with a hydrophobic treatment agent such as a coupling agent, silicone or a higher fatty acid to decrease an oil absorption of the particles (Japanese Patent Application Laid-open (KOKAI) No. 7-27773 (1995)), or the like.

Magnetic particles for the production of a magnetic toner which are free from the falling-off from the toner particles, and a magnetic toner using the magnetic particles which shows a good fluidity and produces visual images having a higher definition upon the development of electrostatic latent images, are most demanded at present. However, the afore-mentioned conventional processes fails to provide such magnetic particles and magnetic toner.

That is, the magnetite particles described in Japanese Patent Application Laid-open (KOKAI) No. 5-345616 (1993) have grain-shaped protrusions on a surface thereof. However, individual protrusions are too small so that the falling-off of the magnetite particles from the toner particles cannot be sufficiently prevented.

The magnetite particles described in Japanese Patent Application Laid-open (KOKAI) No. 5-43253 (1993) each have not less than 10 faces on a surface thereof. However, each face of the magnetite particle is not uneven but flat so that the falling-off of the magnetite particles from the toner particles cannot also be prevented.

The magnetite particles described in Japanese Patent Application Laid-open (KOKAI) No. 5-213620 (1993) is prepared by adding 1.0 to 1.1 equivalent of alkali based on ferrous iron during a first reaction. However, the obtained magnetite particles is of approximately a spherical shape and a large particle size distribution, thereby failing to produce magnetite particles having a uniform particle diameter.

The magnetite particles described in Japanese Patent Publication (KOKOKU) No. 3-9045 (1991) each have a spherical shape and is prepared at a pH as low as less than 8.0 without adjusting the pH during a first reaction.

Finally, the magnetite particles described in Japanese Patent Publication (KOKOKU) No. 1-36864 (1989) each have a octahedral shape whose faces are not uneven but flat so that the falling-off of the magnetite particles from the toner particles cannot also be prevented.

Accordingly, the technical problems of the present invention aim at providing magnetic iron oxide particles for a magnetic toner which are free from the falling-off from toner particles and the magnetic toner using the magnetic iron oxide particles which shows a good fluidity and a uniform triboelectric property so that visual images having a high definition can be produced upon the development of electrostatic latent images.

As a result of intense studies of the present inventors, it has been found that by carrying out two-step reaction comprising a first step of producing magnetite core particles by passing an oxygen-containing gas into an aqueous ferrous salt reaction solution containing ferrous hydroxide colloid prepared by reacting an aqueous ferrous salt solution with 0.80 to 0.99 equivalent of an aqueous alkali hydroxide based on a ferrous salt in the aqueous ferrous salt solution while heating the reaction solution in a temperature range of 70° to 100° C., wherein during the reaction, either an aqueous solution of a water-soluble silicate in an amount of 1.0 to 8.0 atomic % (calculated as an element Si) based on Fe is dividedly added to the reaction solution in at least two parts or the aqueous solution of the water-soluble silicate at a rate of 0.5 to 5.0 wt %/minute based on a total amount of Si is continuously dropped to the reaction solution, and a pH of said aqueous ferrous salt reaction solution is adjusted to 7.5 to 9.5 when the degree of oxidation of $Fe^{2+}$ ($Fe^{3+}$/whole Fe) during the reaction is not less than 20%; and a second step of growing the magnetite core particles by adding not less than 1.00 equivalent of an aqueous alkali hydroxide solution based on residual $Fe^{2+}$ present in the reaction solution after completing the first step, and passing an oxygen-containing gas into the reaction solution while heating the reaction solution in a temperature range of 70° to 100° C., the thus-obtained magnetite particles having an average particle diameter of 0.05 to 0.50 μm, which are of substantially a granular shape, more specifically a confeitos-shape wherein protrusions having round crests are present on a surface of each particle (i.e., each magnetite particle having a plurality of mountain-shaped protrusions with unsharpened crests on a surface of each particle), and the number of the mountain-shaped protrusions with unsharpened crests formed on a surface of each particle being 2 to 30 when viewed in projected plan, cause no falling-off from toner particles when produced by using such magnetite particles and are capable of providing the toner particles having an excellent fluidity. The present invention has been attained on the basis of this finding.

SUMMARY OF THE INVENTION

It is an object of the present invention to provide magnetite particles, magnetic iron oxide particles for magnetic toner which are free from the falling-off from toner particles and capable of providing a magnetic toner having a good fluidity so that visual images having a high definition can be produced upon the development of electrostatic latent images, a process for the production thereof, and the magnetic toner using the magnetic iron oxide particles.

To accomplish the aims, in a first aspect of the present invention, there are provided magnetite particles having an average particle diameter of 0.05 to 0.50 µm, each of the magnetite particles having a plurality of mountain-shaped protrusions with unsharpened crests on a surface of each particle, the number of the mountain-shaped protrusions formed on the surface of each magnetite particle being in the range of 2 to 30 when viewed in projected plan.

In a second aspect of the present invention, there are provided magnetite particles having an average particle diameter of 0.05 to 0.50 µm and having a deposited oxide, hydroxide or hydrous oxide of at least one element selected from the group consisting of Al, Ti, Mg, Si, Co, Zr, Mn and Zn or mixture thereof on the surface thereof, each of the magnetite particles having a plurality of mountain-shaped protrusions with unsharpened crests on a surface of each particle, the number of the mountain-shaped protrusions formed on the surface of each magnetite particle being in the range of 2 to 30 when viewed in projected plan.

In a third aspect of the present invention, there are provided magnetite particles having an average particle diameter of 0.05 to 0.50 µm and having a deposited hydrophobic treatment agent on the surface thereof, each of the magnetite particles having a plurality of mountain-shaped protrusions with unsharpened crests on a surface of each particle, the number of the mountain-shaped protrusions formed on the surface of each magnetite particle being in the range of 2 to 30 when viewed in projected plan.

In a fourth aspect of the present invention, there are provided magnetite particles having an average particle diameter of 0.05 to 0.50 µm and having in turn a deposited oxide, hydroxide or hydrous oxide of at least one element selected from the group consisting of Al, Ti, Mg, Si, Co, Zr, Mn and Zn or mixture thereof on the surfaces of the particles, and a deposited hydrophobic treatment agent on the surface of the deposition of the oxide, hydroxide, hydrous oxide or mixture thereof, each of the magnetite particles having a plurality of mountain-shaped protrusions with unsharpened crests on a surface of each particle, the number of the mountain-shaped protrusions formed on the surface of each magnetite particle being in the range of 2 to 30 when viewed in projected plan.

In a fifth aspect of the present invention, there are provided magnetic iron oxide particles for a magnetic toner, which comprise not less than 60% in number of magnetite particles described in any of the afore-mentioned first to fourth aspects, have an average particle diameter of 0.05 to 0.50 µm and contain 0.9 to 6.5 atomic % of silicon (calculated as an element Si) based on Fe.

In a sixth aspect of the present invention, there is provided a magnetic toner comprising magnetic iron oxide particles described in the afore-mentioned fifth aspect and a binder resin.

In a seventh aspect of the present invention, there is provided a process for producing magnetic iron oxide particles for a magnetic toner, which process comprises a first step of passing an oxygen-containing gas into an aqueous ferrous salt reaction solution containing ferrous hydroxide colloid prepared by reacting an aqueous ferrous salt solution with 0.80 to 0.99 equivalent of an aqueous alkali hydroxide solution based on a ferrous salt in the aqueous ferrous salt solution while heating the reaction solution in a temperature range of 70° to 100° C., to produce magnetite core particles, wherein an aqueous solution of water-soluble silicate is either added in at least two parts to the reaction solution in a total amount of 1.0 to 8.0 atomic % (calculated as an element Si) based on Fe, or dropped in the reaction solution at a rate of 0.5 to 5.0 wt %/minute based on a total amount of Si to be added, and the pH of the reaction solution is adjusted to 7.5 to 9.5 when the degree of oxidation of $Fe^{2+}$ ($Fe^{3+}$/whole Fe) in the first step is not less than 20%; and a second step of growing the magnetite core particles by adding to the reaction solution not less than 1.00 equivalent of an aqueous alkali hydroxide solution based on residual $Fe^{2+}$ present in the reaction solution after completion of the first step, and passing an oxygen-containing gas into the reaction solution while heating the reaction solution in a temperature range of 70° to 100° C.

DETAILED DESCRIPTION OF THE INVENTION

Figure 1:
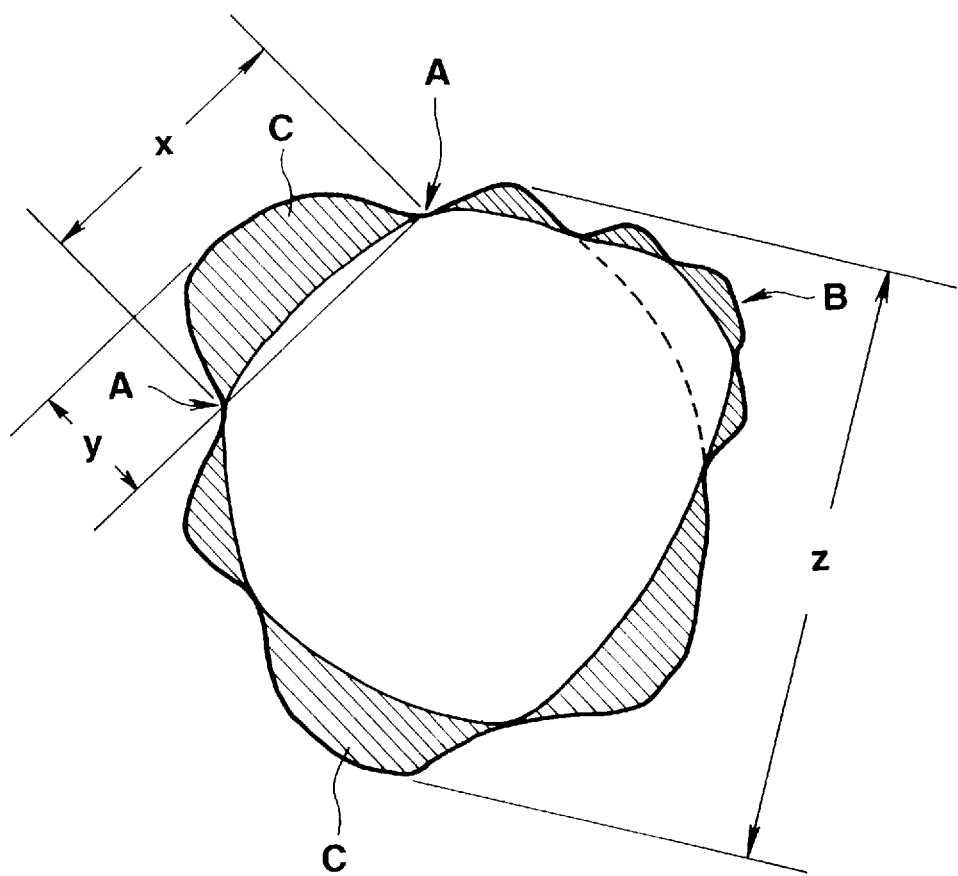
FIG. 1 is a schematic enlarged view showing a shape of a magnetite particle according to the present invention, to explain the concept of the shape thereof.

First, the magnetite particles according to the present invention are described as follows.

The magnetite particles according to the present invention are represented by the formula of $(FeO)_x \cdot Fe_2O_3$ ($0 < x \leq 1$) and may contain not more than 10 atomic %, as a total amount, of at least one metal element other than iron, selected from the group consisting of Mn, Zn, Ni, Cu, Al and Ti, based on Fe.

The magnetite particles according to the present invention contain 0.9 to 6.5 atomic %, preferably 1.3 to 5.3 atomic % of silicon (calculated as an element Si) based on Fe.

The magnetite particles according to the present invention have an average particle diameter (major particle diameter) of 0.05 to 0.50 µm, preferably 0.10 to 0.30 µm.

Further, each of the magnetite particles according to the present invention is substantially granular and has a plurality of mountain-shaped protrusions with unsharpened crests on surface of the each particle. The number of the mountain-shaped protrusions on the surface of each magnetite particle is in the range of 2 to 30, preferably 5 to 20 when viewed in projected plan.

When the number of the mountain-shaped protrusions are less than 2, effects of preventing the falling-off of the magnetite particles from the surface of the toner particle cannot be sufficiently exhibited. On the other hand, when the number of mountain-shaped protrusions are more than 30, the contact area between the magnetite particles and a binder resin on the surface of the toner particle is increased but the size of the individual protrusions lessens, so that the effects of preventing the falling-off from the surface of the toner particle cannot also be obtained sufficiently.

It is preferred that the "mountain-shaped protrusions" formed on a surface of each magnetite particle according to the present invention satisfy the following requirements (1) to (3). That is, when each magnetite particles is viewed in projected plan, for example, on a photomicrograph obtained by a transmission-type electron microscope.

(1) The base of the protrusion is convex-shaped (i.e., a valley-like shape relative to a mountain-shaped crest).

(2) In the case where two or more projecting portions overlap each other in a stepped manner, only the highest projecting portion is called as the mountain-shaped protrusion.

(3) The following formulae (I) and (II) may be satisfied:

$$0.10 \leq x/z \leq 0.40 \quad (I)$$

$$0.05 \leq y/z \leq 0.30 \quad (II)$$

where x and y represent a bottom length and a height of each mountain-shaped protrusion, respectively, and z represents an average particle diameter (major particle diameter) of the magnetite particle.

Whether the afore-mentioned requirements (1) and (2) are satisfied or not is determined by a visual observation on the projected plan (e.g., a photomicrograph from a transmission-type electron microscope).

Whether the formulae (I) and (II) of the afore-mentioned requirement (3) are satisfied measuring determined by measuring the bottom length (x) and the height (y) of the respective protrusions on a surface of each magnetite particle and the particle diameter (z) of the magnetite particle, and then calculating values of x/z and y/z.

Incidentally, FIG. 1 is a schematic enlarged view showing a shape of the magnetite satisfying all the above-mentioned requirements (1) to (3) to explain the concept of the shape of the magnetite particle of the present invention. The term "convex-shaped" formed around the base of each protrusion as described in the afore-mentioned requirement (1) means portions indicated by arrows A and the term "only the highest projecting portion" as described in the afore-mentioned requirement (2) means a portion indicated by an arrow B. The bottom length (x), the height (y) and the particle diameter (z) as described in the afore-mentioned requirement (3) are indicated by corresponding dimensions x, y and z, respectively, in FIG. 1. Further, the oblique portions (C) in FIG. 1 represent the mountain-shaped protrusions with unsharpened crests.

The magnetite particles according to the second aspect of the present invention, are those on surfaces of which is deposited an oxide, a hydroxide or a hydrous oxide of at least one element (hereinafter referred to merely as "specified element") selected from the group consisting of Al, Ti, Mg, Si, Co, Zr, Mn and Zn, or a mixture thereof. The amount of the at least one specified element (i.e., Al, Ti, Mg, Si, Co, Zr, Mn or Zn) deposited on the surfaces of the magnetite particles is preferably 0.02 to 10% by weight, preferably 0.05 to 5.0% by weight (calculated as the specified element) based on the weight of the magnetite particles.

The magnetite particles according to the third aspect of the present invention are those on surfaces of which is deposited at least one hydrophobic treatment agent selected from the group consisting of a coupling agent, a silicone and an higher fatty acid having not less than 15 carbon atoms.

As the suitable coupling agents, silane-based coupling agents, titanate-based coupling agents, aluminate-based coupling agents or the like can be used.

Specific examples of the silicones include a silicone oil or the like.

As the suitable higher fatty acids, stearic acid, isostearic acid, palmitic acid, iso-palmitic acid, oleic acid or the like can be used.

The amount of the at least one hydrophobic treatment agent deposited is preferably 0.1 to 10.0% by weight, more preferably 0.2 to 5.0% by weight based on the weight of the magnetite particles.

The magnetic iron oxide particles according to the fourth aspect of the present invention are those on surfaces of which are in turn deposited the oxide, the hydroxide or the hydrous oxide of the afore-mentioned specified element or the mixture thereof, and the hydrophobic treatment agent. The amount of the specified element deposited is preferably 0.02 to 10% by weight, more preferably 0.5 to 5.0% by weight based on the weight of the magnetite particles, and the amount of the hydrophobic treatment agent deposited is preferably 0.1 to 10.0% by weight, more preferably 0.2 to 5.0% by weight based on the weight of the magnetite particles.

Next the magnetic iron oxide particles for magnetic toner described in the fifth aspect of the present invention are described in detail below.

Figure 2:
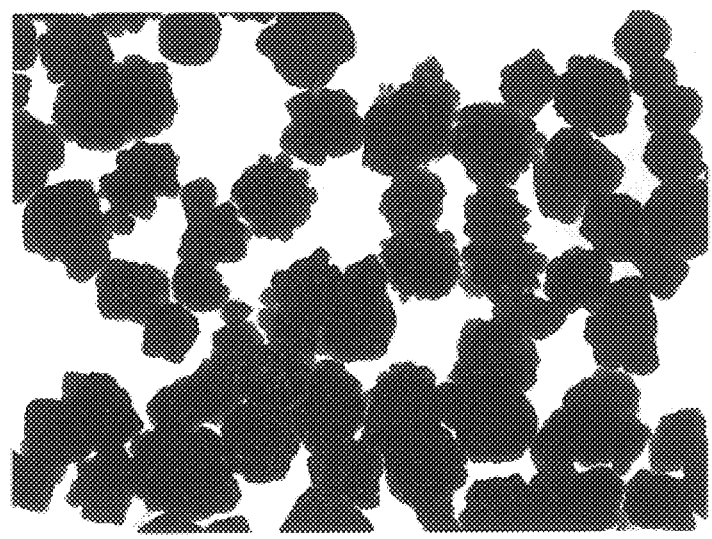
FIG. 2 is an electron photomicrograph (×50,000) of magnetite particles obtained in Example 1.

The magnetic iron oxide particles for magnetic toner according to the present invention comprise magnetite particles represented by the formula of $(FeO)_x \cdot Fe_2O_3$ ($0<x\leq1$) As described hereinafter with respect to an electron photomicrograph as shown in FIG. 2, the magnetic iron oxide particles for magnetic toner according to the present invention comprise specific magnetite particles which are each of substantially granular and have 2 to 30 numbers of the mountain-shaped protrusions with unsharpened crests on a surface of each particle, as described in any one of the first aspect to fourth aspect of the present invention, in the percentage of the number of not less than 60%, preferably not less than 70% relative to a whole number of particles. The remaining particles in the percentage of the number of not more than 40%, preferably not more than 30% relative to a whole number of particles may be composed of granular magnetite particles. When the percentage is less than 60%, the effects of preventing the falling-off of the magnetic iron oxide particles from the toner particles cannot be sufficiently obtained when they are applied to a toner.

The afore-mentioned percentage of the number of the specific particles relative to a whole number of particles is determined as follows. That is, the number of the magnetite particles satisfying the afore-mentioned requirements (1) to (3) and a whole number of the particles are counted on a photomicrograph obtained by a transmission-type electron microscope to calculate the percentage. The whole number of the particles measured is not less than 30, preferably not less than 50.

The magnetic iron oxide particles for magnetic toner according to the present invention have an average particle diameter of 0.05 to 0.50 $\mu$m, preferably 0.10 to 0.30 $\mu$m. When the average particle diameter is less than 0.05 $\mu$m, the number of particles per unit volume becomes too large and, therefore, the number of contact points between particles are increased. As a result, the adhesion force between particles is increased so that these particles have deteriorated dispersibility in a binder resin when preparing a magnetic toner. On the other hand, when the average particle diameter is more than 0.50 μm, the number of the magnetic iron oxide particles contained in each toner particle becomes small, so that uneven distribution of the magnetic iron particles in each toner particle is caused, resulting in damage to uniformity in triboelectric property of the toner.

The BET specific surface area of the magnetic iron oxide particles for magnetic toner according to the present invention is in the range of 3 to 30 m$^2$/g, preferably 5 to 20 m$^2$/g.

The saturation magnetization of the magnetic iron oxide particles for magnetic toner according to the present invention is in the range of 80 to 92 emu/g, preferably 82 to 90 emu/g. The value "92 emu/g" indicates a theoretical saturation magnetization of magnetite and, therefore, the saturation magnetization cannot exceed this value. When the saturation magnetization is less than 80 emu/g, these magnetic iron oxide particles tend to have a reddish color by the lower amount of Fe$^{2+}$ in the magnetic iron oxide particles, which is unsuitable for application of the magnetic iron oxide particles to the magnetic toner.

The magnetic iron oxide particles for magnetic toner according to the present invention contain 12 to 24% by weight, preferably 17 to 24% by weight of Fe$^{2+}$ based on the total weight of the magnetic iron oxide particles. When the content of Fe$^{2+}$ is less than 12% by weight, the magnetic iron oxide particles cannot have a sufficient blackness. On the other hand, when the content of Fe$^{2+}$ is more than 24% by weight, the magnetic iron oxide particles are likely to be readily oxidized and therefore becomes unstable against environmental conditions.

Further, the magnetic iron oxide particles for magnetic toner according to the present invention contain 0.9 to 6.5 atomic %, preferably 1.3 to 5.3 atomic % of silicon (calculated as an element Si) based on Fe. When the content of Si is less than 0.9 atomic %, the amount of Si on a surface of each particle is reduced so that the fluidity of the magnetic iron oxide particles is deteriorated. On the other hand, when the content of Si is more than 6.5 atomic %, the amount of Si contained in the magnetic iron oxide particles is increased so that a hygroscopic property thereof becomes high. For this reason, when such magnetic iron oxide particles are used as a starting material of to a toner, there is a tendency that the stability thereof against environmental conditions is adversely affected. By Si present independently from the magnetic iron oxide particles, the magnetic iron oxide particles are disturbed from being uniformly electrostatically charged so that the triboelectric property thereof is deteriorated.

Further, the content of Si deposited on the surfaces of the magnetic iron oxide particles is in the range of 0.05 to 1.0 atomic %, preferably 0.08 to 0.80 atomic % (calculated as an element Si) based on Fe. When the content of Si is less than 0.05 atomic %, a sufficient fluidity cannot be obtained when such magnetic iron oxide particles are used as a magnetic material of a toner. On the other hand, when the content of Si is more than 1.0 atomic %, the hygroscopic property of the magnetic iron oxide particles becomes high so that when such magnetic iron oxide particles are used as a magnetic material of a toner, there is a tendency that the stability of the toner against environmental conditions is adversely affected.

The magnetic iron oxide particles for magnetic toner according to the present invention are those on surfaces of which is deposited an oxide, a hydroxide or a hydrous oxide of at least one specified element selected from the group consisting of Al, Ti, Mg, Si, Co, Zn, Mn and Zn, or a mixture thereof, in the amount of the at least one specified element deposited on the surfaces of the magnetic iron oxide particles of preferably 0.02 to 10% by weight, preferably 0.05 to 5.0% by weight based on the weight of the magnetic iron oxide particles. When the amount of the specified element deposited is less than 0.02% by weight, the particles may not exhibit a sufficient heat resistance. On the other hand, when the amount of the specified element deposited is more than 10% by weight, Si on surfaces of the respective particles may be entirely covered with the specified element deposited, so that the fluidity thereof may be deteriorated.

The magnetic iron oxide particles for magnetic toner according to the present invention are those on surfaces of which is deposited at least one hydrophobic treatment agent selected from the group consisting of a coupling agent, silicone and a higher fatty acid having not less than 15 carbon atoms, in the amount of the at least one hydrophobic treatment agent deposited of preferably 0.1 to 10.0% by weight, more preferably 0.2 to 5.0% by weight based on the weight of the magnetic iron oxide particles. When the amount of the at least one hydrophobic treatment agent deposited is less than 0.1% by weight, the particles may not exhibit a sufficient hydrophobic property. On the other hand, when the amount of the at least one hydrophobic treatment agent deposited is more than 10.0% by weight, Si on surfaces of the respective particles may be entirely covered with the hydrophobic treatment agent deposited, so that the fluidity thereof may be deteriorated.

The magnetic iron oxide particles for magnetic toner according to the present invention are those on surfaces of which are in turn deposited the oxide, the hydroxide or the hydrous oxide of the at least one specified element or the mixture thereof, and the at least one hydrophobic treatment agent, in the amount of the specified element deposited on the surfaces of the magnetic iron oxide particles of preferably 0.02 to 10.0% by weight, more preferably 0.05 to 5.0% by weight based on the weight of the magnetic iron oxide particles and in the amount of the hydrophobic treatment agent further deposited on the specified element of preferably 0.1 to 10.0% by weight, more preferably 0.2 to 5.0% by weight based on the weight of the magnetic iron oxide particles. When the amount of the specified element deposited is less than 0.02% by weight, the resultant particles may not have a sufficient heat resistance. On the other hand, when the amount of the specified element deposited is more than 10.0% by weight, Si on surfaces of the respective particles may be entirely covered with the specified element deposited, so that the fluidity thereof may be deteriorated. Further, when the amount of the hydrophobic treatment agent deposited over the specified element is less than 0.1% by weight, the resultant particles may not have a sufficient hydrophobic property. On the other hand, when the amount of the hydrophobic treatment agent deposited over the specified element is more than 10.0% by weight, Si on surfaces of the respective particles may be entirely covered with the hydrophobic treatment agent, so that the fluidity thereof may be deteriorated.

The magnetic iron oxide particles for magnetic toner according to the present invention have a compaction degree, as an index of fluidity, of preferably not more than 50, more preferably not more than 45 and, therefore, can exhibit a good fluidity.

The magnetic iron oxide particles non-deposited for magnetic toner according to the present invention have a triboelectric charge of 0 to −60 μC/g, preferably −2 to −50 μC/g. Whereas, the magnetic iron oxide particles deposited for magnetic toner according to the present invention have a triboelectric charge of 20 to −60 μC/g, preferably +10 to −50 μC/g.

The magnetic iron oxide particles for magnetic toner according to the present invention, on surfaces of which are deposited (covered) the hydrophobic treatment agent, show an excellent dispersibility and have an oil absorption of preferably not more than 20 ml/100 g, more preferably not more than 18 ml/100 g.

Whereas, the magnetic iron oxide particles for magnetic toner according to the present invention, on surfaces of which are deposited the oxide, the hydroxide or the hydrous oxide of the at least one specified element or the mixture thereof, show an excellent heat resistance and have a threshold temperature of exothermic reaction of preferably not less than 150° C.

Next, the process for the production of magnetic iron oxide particles according to the present invention is described in detail below.

As the aqueous ferrous salt solution used in the first stage reaction of the process according to the present invention, an aqueous ferrous sulfate solution, an aqueous ferrous chloride solution or the like may be exemplified.

As the aqueous alkali hydroxide solutions used in the first stage reaction of the process according to the present invention, an aqueous solution of alkali metal hydroxide such as sodium hydroxide or potassium hydroxide; an aqueous solution of alkali earth metal hydroxide such as magnesium hydroxide or calcium hydroxide; or the like may be exemplified.

The amount of the aqueous alkali hydroxide solution used before adjusting a pH of the reaction mixture in the first stage reaction is in the range of 0.80 to 0.99 equivalent, preferably 0.90 to 0.99 equivalent based on $Fe^{2+}$ in the aqueous ferrous salt solution. When the amount of the aqueous alkali hydroxide solution is less than 0.80 equivalent, goethite is unsuitably contained in the reaction product so that the aimed magnetite particles cannot be produced. On the other hand, when the amount of the aqueous alkali hydroxide solution is more than 0.99 equivalent, the particle size distribution of the resultant particles becomes large so that the magnetite particles having a uniform particle diameter cannot be obtained.

The reaction temperature used in the first stage reaction of the process according of the present invention is in the range of 70° to 100° C. When the reaction temperature is less than 70° C., acicular goethite particles are unsuitably contained in the reaction product. On the other hand, when the reaction temperature is more than 100° C., since a special equipment such as autoclave is required to conduct the reaction though magnetite particles are produced, this is disadvantageous in view of industrial applications.

As the oxidizing means in the first stage reaction of the process according to the present invention, there can be used a method of passing an oxygen-containing gas, e.g., air into the reaction solution.

As the suitable water-soluble silicates used in the first stage reaction of the process according to the present invention, sodium silicate, potassium silicate or the like may be exemplified.

The amount of the water-soluble silicate added is in the range of 1.0 to 8.0 atomic %, preferably 1.5 to 6.5 atomic % (calculated as an element Si) based on Fe. When the amount of the water-soluble silicate added is less than 1.0 atomic %, the resultant particles are of a hexahedral shape so that effects of preventing the falling-off thereof from surfaces of the toner particles cannot be sufficiently exhibited. On the other hand, when the amount of the water-soluble silicate added is more than 8.0 atomic %, acicular goethite particles are unsuitably contained in the resultant particles. Also, since the content of silicon becomes large, the amount of water absorbed in the particles is increased so that when such particles are used as a magnetic material of a toner, there is a tendency that the stability of the toner against environmental conditions is adversely affected. Further, since Si is precipitated independently from the magnetic iron oxide particles, a uniform triboelectric of the particles is disturbed so that the stability in triboelectric of the particles is deteriorated.

In accordance with the present invention, it is required that the water-soluble silicate is added to the reaction solution during such the production of the magnetite core particles by passing the oxygen-containing gas into the aqueous ferrous salt reaction solution containing ferrous hydroxide colloid in the first stage reaction.

The water-soluble silicate can be dividedly or continuously added to the reaction solution, specifically added in at least two parts, preferably in not less than five parts, or dropped continuously to the reaction solution. In the case where the water-soluble silicate is dropped continuously, the dropping rate of the water-soluble silicate is in the range of 0.5 to 5.0% by weight/minute, preferably 1.0 to 3.0% by weight/minute based on the total amount of the water-soluble silicate to be added.

If the entire amount of the water-soluble silicate is added once, it is difficult that Si is contained in the particles so that Si is unsuitably precipitated independently from the particles.

In the first stage reaction of the process according to the present invention, when the degree of oxidation of ferrous $Fe^{2+}$ (indicated by the percentage of $Fe^{3+}$/whole Fe) is not less than 20%, the pH of the suspension is required to be in the range of 7.5 to 9.5 . Further, when the degree of oxidation of ferrous $Fe^{2+}$ (a percentage of $Fe^{3+}$/whole Fe) is not less than 30%, the pH of the suspension is required to be in the range of 8.0 to 9.5. If the pH of the suspension is out of the afore-mentioned range, the pH of the suspension is adjusted to 7.5 to 9.5 by adding thereto an acid such as sulfuric acid or alkali such as an aqueous alkali hydroxide solution. When the pH of the suspension is less than 7.5, unevenness of surfaces of the particles lessens so that each particle has approximately a spherical shape, and such particles cannot display sufficient effects of preventing the falling-off of the magnetic iron oxide particles from surfaces of the toner particles. On the other hand, when the pH of the suspension is more than 9.5, it is difficult that Si is deposited on the surface of the particle so that when such particles are used as a magnetic material of a toner, the toner is deteriorated in fluidity.

The amount of the aqueous alkali hydroxide solution used in the second stage reaction of the process according to the present invention is not less than 1.00 equivalent based on $Fe^{2+}$ remaining at the initiation of the second stage reaction. When the amount of the aqueous alkali hydroxide solution used in the second stage reaction is less than 1.00 equivalent, an entire amount of the residual $Fe^{2+}$ cannot be precipitated. Practically, with respect to the amount of the aqueous alkali hydroxide solution added in the second stage reaction, an appropriate amount of not less than 1.00 equivalent can be selected in view of industrial applications.

The reaction temperature of the second stage reaction of the process according to the present invention may be appropriately selected from similar conditions for the reaction temperature of the first stage reaction. Also, the oxidizing means may be selected from similar conditions of those used in the first stage reaction.

Incidentally, a sufficient agitation of the suspension can be carried out for an appropriate period of time between charging of raw materials and initiation of the first stage reaction and/or between the first and second stage reactions, if required.

The deposition of the oxide, the hydroxide or the hydrous oxide of the at least one specified element (i.e., at least one element selected from the group consisting of Al, Ti, Mg, Si, Co, Zr, Mn and Zn) or the mixture thereof on the surfaces of the respective magnetic iron oxide particles can be conducted by adding inorganic compound of the specified element or an aqueous solution thereof to an aqueous suspension of the magnetic iron oxide particles or the aqueous suspension produced after completion of the afore-mentioned second stage reaction, and adjusting the pH of the resultant suspension to such a known range that the specified element can be deposited in the form of an oxide, a hydroxide or a hydrous oxide thereof.

In the case where dried magnetic iron oxide particles are used to prepare the afore-mentioned aqueous suspension thereof, it is required that such particles are sufficiently dispersed in water in order to obtain a uniformly deposited layer thereof on the particles. Whereas, when the aqueous suspension of the magnetic iron oxide particles obtained after completion of the second stage reaction is used, it is more advantageous from the industrial viewpoint because such an aqueous suspension necessitates no dispersing process.

Any inorganic compounds of the afore-mentioned specified element can be used for the deposition thereof as far as they are water-soluble.

Examples of the aluminum compounds may include aluminum sulfate, aluminum chloride, aluminum nitrate, sodium aluminate or the like.

Examples of the titanium compounds may include titanyl sulfate, titanium chloride or the like.

Examples of the magnesium compounds may include magnesium sulfate, magnesium chloride or the like.

Examples of the silicon compounds may include water glass No. 3, sodium silicate, potassium silicate or the like.

Examples of the cobalt compounds may include cobalt sulfate, cobalt chloride or the like.

Examples of the zirconium compounds may include zirconium sulfate, zirconium chloride or the like.

Examples of the manganese compounds may include manganese sulfate, manganese chloride or the like.

Examples of the zinc compounds may include zinc sulfate, zinc chloride or the like.

The amount of the afore-mentioned inorganic compound of the specified element added is preferably 0.02 to 10% by weight, more preferably 0.05 to 5.0% by weight (calculated as the specified element). When the amount of the inorganic compound added is less than 0.02% by weight, the resultant magnetic iron oxide particles cannot exhibit a sufficient heat resistance. On the other hand, when the amount of the inorganic compound added is more than 10% by weight, there arises such a disadvantage that the inorganic compound is independently precipitated outside of the surfaces of the particles.

After the inorganic compound of the specified element is added, the pH of the suspension is adjusted to 4 to 12 in the case of the aluminum compounds, to not less than 3 in the case of the titanium compounds, to not less than 9.5 in the case of the magnesium compounds, to not more than 9.5 in the case of the silicon compounds, to not less than 7.5 in the case of the cobalt compounds, to not less than 2 in the case of the zirconium compounds, to not less than 8.5 in the case of the manganese compounds or to 6.5 to 14 in the case of the zinc compounds.

In accordance with the present invention, the deposition of the hydrophobic treatment agent onto the surfaces of the respective particles can be accomplished by either dry or wet process. Preferably, the dry process is used. In this case, the dry process can be conducted by means of a wheel-type kneader, an attrition mill, Henschel mixer or the like.

The amount of the at least one added hydrophobic treatment agent mentioned above is preferably 0.1 to 10.0% by weight, more preferably 0.2 to 5.0% by weight based on the weight of the magnetic iron oxide particles. When the amount of the at least one hydrophobic treatment agent deposited is less than 0.1% by weight, the particles cannot have a sufficient hydrophobic property. On the other hand, when the amount of the at least one hydrophobic treatment agent deposited is more than 10.0% by weight, an entire amount of the hydrophobic treatment agent cannot be adhered onto the surfaces of the particles so that there arises such a disadvantage that an excess amount of the hydrophobic treatment agent is independently present outside of the surfaces of the particles.

Next, the magnetic toner according to the present invention is described in detail below.

The magnetic toner according to the present invention has a volume-average particle diameter of 3 to 20 $\mu$m, preferably 5 to 15 $\mu$m.

The magnetic toner according to the present invention may comprise the afore-mentioned magnetic iron oxide particles for magnetic toner and a binder resin, and may further contain a mold release agent, a colorant, a charge-controlling agent or other additives, if required.

The amount of the magnetic iron oxide particles in the magnetic toner is 20 to 150 parts by weight, preferably 30 to 120 parts by weight based on 100 parts by weight of the binder resin.

The magnetic toner according to the present invention is almost free from the falling-off of the magnetic iron particles from a surface of each toner particle.

Further, the magnetic toner according to the present invention has a good fluidity and, therefore, can produce visual images having a high definition.

As the binder resin of the magnetic toner according to the present invention, there can be used vinyl-based polymers or copolymers prepared by the polymerization or the copolymerization of vinyl-based monomers such as styrene-based compounds, alkyl acrylates, alkyl methacrylates or the like. Examples of the suitable styrene-based compounds as the vinyl-based monomers may include styrene, ($\alpha$-methylstyrene, p-chlorostyrene or substituted compounds of these styrene-based monomers. Examples of the alkyl acrylates and the alkyl methacrylates as the vinyl-based monomers may include monocarboxylic acids having double bonds, esters of the monocarboxylic acids or substituted compounds thereof. As specific examples of the suitable alkyl acrylates, acrylic acid, methyl acrylate, ethyl acrylate, butyl acrylate, dodecyl acrylate, octyl acrylate, isobutyl acrylate, hexyl acrylate or the like may be exemplified. As specific examples of the suitable alkyl methacrylates, methyl methacrylate, ethyl methacrylate, butyl methacrylate, octyl methacrylate, isobutyl methacrylate, dodecyl methacrylate, hexyl methacrylate or the like may be exemplified.

It is preferred that the vinyl-based copolymers contain 50 to 95% by weight of the styrene-based component.

The production of the vinyl-based polymers or copolymers may be carried out by know methods such as a bulk polymerization, a solution polymerization, a suspension polymerization, an emulsion polymerization or the like.

Other known polymers or copolymers such as polyester-based resins, epoxy resins, polyurethane resins or the like may be added to the afore-mentioned vinyl-based polymers or copolymers, if required.

Examples of the suitable mold release agents may include paraffins having not less than 8 carbon atoms, polyolefins or the like. Specific examples of the paraffins and polyolefins may include polyethylene, polypropylene, paraffin waxes, paraffin latexes, microcrystalline waxes, carnauba waxes or the like. The amount of these paraffins or polyolefins in the binder resin is usually in the range of 1 to 10% by weight.

As the colorants, appropriate pigments or dyes may be optionally used depending upon applications. Examples of the suitable colorants may include carbon black, chrome yellow, aniline blue, phthalocyanine blue, ultramarine blue, quinacridone, benzidine yellow or the like.

As the charge-controlling agents, there may be used fluorine-based surface active agents, azo-based metal complexes, salicylic acid-chromium complex, dialkyl salicylates, naphthoic acid-metal complexes, azine dyes such as nigrosine, tertiary ammonium salts, carbon black or the like.

Further, other additives can be contained in the binder resins according to aimed applications. For example, tin oxide, strontium titanate, barium titanate, tungsten carbide or the like may be used as an abrasive agent. In addition, resin particles or inorganic particles serving as an triboelectric assistant, a conductivity-imparting agent, a caking-preventive agent, a fluidity-imparting agent or the like can be added to the binder resin, if required.

The magnetic toner according to the present invention can be produced by a known method including mixing, kneading and pulverization. Specifically, the afore-mentioned magnetic iron oxide particles for magnetic toner and the binder resin are intimately mixed by a mixer, if required, together with a colorant, a mold release agent, a charge-controlling agent or other additives. Thereafter, the resultant mixture is melted and kneaded in a heating kneader to compatibilize the binder resin and others with each other, and to disperse the magnetic iron oxide particles therein. The kneaded mixture is cooled and then pulverized and classified to prepare a magnetic toner.

As the mixer used for the preparation of the magnetic toner, Henschel mixer, a ball mill or the like are exemplified. As the heating kneader, there can used a roll mill, an ordinary kneader, a twin-screw extruder or the like. In addition, the pulverization of the kneaded mixture can be carried out by a cutter mill, a jet mill or other mills. Also, the classification of the pulverized mixture can be carried out by known methods.

Alternatively, the magnetic toner according to the present invention can be prepared by the suspension polymerization method or the emulsion polymerization method. In the case of the suspension polymerization method, a monomer composition is first prepared by dissolving or dispersing the polymerizable monomer, the magnetic iron oxide particles for magnetic toner and the colorant, if required, together with a polymerization initiator, a cross-linking agent, a charge-controlling agent or other additives. The thus-prepared monomer composition is added to an aqueous solution containing a suspension stabilizer while stirring, and polymerized and granulated thereby obtaining toner particles. In the case of the emulsion polymerization method, the polymerizable monomer, the magnetic iron oxide particles for magnetic toner, the colorant, the polymerization initiator and the like are dispersed in water and subjected to a polymerization reaction while adding an emulsifier thereto so that toner particles having an appropriate particle size can be prepared.

The magnetic iron oxide particles for magnetic toner according to the present invention comprising not less than 60%, in number, of magnetite particles having an average particle diameter of 0.05 to 0.50 μm and such a shape that a plurality of mountain-shaped protrusions with unsharpened crests are formed on a surface of each particle such that the number of the mountain-shaped protrusions is in the range of 2 to 30 when viewed in projected plan, are optimum for the production of magnetic toner because the magnetic iron oxide particles are free from the falling-off from surfaces of toner particles and capable of providing the magnetic toner having a good fluidity and a uniform triboelectric property so that visual images having a high definition can be produced upon the development of electrostatic latent images. Further, in the case where the magnetic iron oxide particles have a threshold temperature of exothermic reaction of not less than 150° C., they can be stably used even under an elevated-temperature condition. Furthermore, in case where the magnetic iron oxide particles have a sufficient hydrophobicity and a lower oil absorption, the magnetic iron oxide particles can exhibit a good dispersibility to a resin.

EXAMPLES

The present invention is described in detail by examples, but these examples are only illustrative but not intended to limit the present invention thereto.

Various properties of the magnetite particles, magnetic iron oxide particles and magnetic toner according to the present invention were measured by the following methods.
Particle diameter and average particle diameter The particle diameter of each particle was measured on a photomicrograph, and the average particle diameter was calculated from the particle diameters of at least 100 magnetic iron oxide particles and at least 20 magnetite particles, respectively.
Specific surface area The specific surface area was measured by a BET method.
Magnetic properties The magnetic properties were measured by a sample vibration-type magnetometer "VSM-3S-15" (manufactured by Toei Kogyo Co., Ltd.), while applying thereto an external magnetic field of up to 10 kOe.
Shape of particles The particles were observed by a scanning electron microscope "S-800" (manufactured by Hitach Ltd.).

The observation was also made as to whether any protrusions satisfying the following requirements (1) to (3) were present on a surface of each magnetite particle.

That is, when each magnetite particle was observed in projected plan, (i.e., on the photomicrograph obtained by the transmission-type electron microscope):

(1) The base of the protrusion was convex-shaped (i.e., a valley-like shape relative to a mountain-shaped crest).

(2) In the case where two or more projecting portions overlapped each other in a stepped manner, only the highest projecting portion was called as the mountain-shaped protrusion.

(3) The following formulae (I) and (II) were satisfied:

$$0.10 \leq x/z \leq 0.40 \tag{I}$$
$$0.05 \leq y/z \leq 0.30 \tag{II}$$

wherein x and y represent a bottom length and a height of each mountain-shaped protrusion, respectively, and z represents an average particle diameter of each magnetite particle.

Whether the afore-mentioned requirements (1) and (2) were satisfied or not was determined by a visual observation on the projected plan (i.e., on a photomicrograph of a transmission-type electron microscope).

Whether the formulae (I) and (II) of the afore-mentioned requirement (3) were satisfied or not was determined by measuring the bottom length (x) and the height (y) of the respective mountain-shaped protrusions on a surface of each magnetite particle and the particle diameter (z) of the magnetite particle by a digitizer "HP-85B" (manufactured by Hewlett Packard Corp.), and then calculating values of x/z and y/z.

The magnetite particles were observed on the projected plan as to whether or not the number of the mountain-shaped protrusions formed on a surface of each particle and satisfying the afore-mentioned requirements (1) to (3) was in the range of 2 to 30. If the result was affirmative, such a particle was recognized as the magnetite particle according to the present invention. Further, the number of the magnetite particles having the 2 to 30 protrusions was determined on the projected plan, to calculate a percentage thereof relative to at least 30 particles measured. If the percentage was not less than 60%, such particles were determined as the magnetic iron oxide particles according to the present invention.

Amount of Si on surfaces of magnetic iron oxide particles before surface treatments The amount of Si was measured by using a fluorescent X-ray analyzer "3063 M-Model" (manufactured by Rigaku Denki Kogyo Co., Ltd.), according to JIS K-0119 "General Procedure for Fluorescent X-ray Analysis".

Next, the particles before the surface treatments were mixed and dispersed in ion-exchanged water to prepare a suspension. Thereafter, the suspension was mixed with an aqueous alkali hydroxide solution while stirring for not less than 30 minutes and then the resultant mixture was filtered and dried to obtain particles. The amount of Si of the thus-obtained particles was measured by using a fluorescent X-ray analyzer "3063 M-Model" (manufactured by Rigaku Denki Kogyo Co., Ltd.), according to JIS K-0119 "General Procedure for Fluorescent X-ray Analysis". The difference in amount of Si on surfaces of the magnetic iron oxide particles between before and after the afore-mentioned alkali treatment was determined as the amount of Si on surfaces of the magnetic iron oxide particles before surface treatments.

Content of $Fe^{2+}$

The content of $Fe^{2+}$ in the magnetic iron oxide particles were determined by the below-mentioned chemical analysis.

0.5 g of the magnetic iron oxide particles were added to and dissolved in 25 cc of a mixed solution of phosphoric acid and sulfuric acid in a ratio of 2:1 in an inert gas atmosphere. After the resultant solution was diluted, several drops of diphenyl amine-sulfonic acid as an indicator were added thereto and then the resultant solution was subjected to an oxidation-reduction titration using an aqueous potassium dichromate solution. When the dilute solution turns into violet color, the titration was terminated. The amount of the aqueous potassium dichromate solution dropped up to the termination of the titration was measured and the content of $Fe^{2+}$ in the magnetic iron oxide particles was calculated from the measured amount thereof.

Amount of Al, Ti, Mg, Si, Co, Zr. Mn or Zn deposited

The amount of Al, Ti, Mg, Si, Co, Zr, Mn or Zn deposited on the surface of the particles was measured by a fluorescent X-ray analyzer "3063 M-Model" (manufactured by Rigaku Denki Kogyo Co., Ltd.), according to JIS K-0119 "General Procedure for Fluorescent X-ray Analysis". An amount of the specified element previously measured before the deposition of the specified element was subtracted from the amount of the specified element measured after the surface treatment and the amount of the specified element deposited by the surface treatment was calculated from the measured amount thereof. If the amount of the specified element deposited was considerably small, the measurement was carried out by using an induction-coupling plasma emission spectroscopic analyzer "SPS-4000" (manufactured by Seiko Denshi Kogyo Co., Ltd.).

Amount of hydrophobic treatment agent deposited

The amount of the hydrophobic treatment agent deposited on the surfaces of the magnetic iron oxide particles was represented as a calculated value obtained by measuring an amount of carbon contained therein by "Horiba metal-contained carbon and sulfur analyzer EMIA-2200" (manufactured by Horiba Seisakusho Co., Ltd.) and estimating a configuration or distribution of the hydrophobic treatment agent on the surfaces of the magnetic iron oxide particles in view of the measured amount of carbon.

Triboelectric charge of magnetic iron oxide particles

The magnetic iron oxide particles were mixed with a carrier "TFV-200/300" (produced by POWDERTEC Co., Ltd.) to prepare a particle mixture containing the magnetic iron oxide particles in a concentration of 5% and then the particle mixture was shaken for 30 minutes. Thereafter, the amount of an electrostatic charge on the surfaces of the magnetic iron oxide particles was measured by a blow-off charged amount-measuring apparatus TB-200 (manufactured by Toshiba Chemical Co., Ltd.). Incidentally, the practically usable charged amount of the magnetic iron oxide particles was in the range of −3 to −30 $\mu C/g$.

Compaction degree of magnetic iron oxide particles

The apparent density ($\rho a$) and the tap density ($\rho t$) of the magnetic iron oxide particles were respectively measured. The compaction degree of the magnetic iron oxide particles was calculated by the following formula.

$$\text{Compaction degree}=[(\rho t-\rho a)/\rho t]\times 100$$

The less the compaction degree, the more the magnetic iron oxide particles exhibited more excellent fluidity. The practically usable compaction degree of the magnetic iron oxide particles was not more than 55.

Incidentally, the apparent density ($\rho a$) was measured by a testing method for pigments according to JIS-K-5101. Whereas, the tap density ($\rho t$) was determined as follows. That is, 10 g of the magnetic iron oxide particles after measuring the apparent density were slowly filled into a 20 cc measuring cylinder through a funnel. The measuring cylinder filled with the magnetic iron oxide particles was caused to be dropped by gravity from a height of 25 mm. After the dropping operation was repeated 600 times, the volume (cc) of the filled particles was measured by reading a scale on the measuring cylinder. The measured volume was substituted in the following formula to calculate the tap density of the magnetic iron oxide particles.

$$\text{Tap density (g/cc)}=10 \text{ (g)/volume after dropping (cc)}$$

Oil absorption of magnetic iron oxide particles

The oil absorption of the magnetic iron oxide particles was measured by the pigment testing method according to JIS-K-5101. The practically usable oil absorption of the magnetic iron oxide particles was not more than 25 ml/100 g.

Heat resistance of magnetic iron oxide particles

The heat resistance of the magnetic iron oxide particles was indicated as an exothermic reaction-initiation temperature (°C.) measured by a differential scanning calorimeter "DSC-200" (manufactured by Seiko Denshi Kogyo Co., Ltd.), according to a differential thermal analysis. The practically usable heat resistance of the magnetic iron oxide particles was not less than 110° C.

Volume average particle diameter of toner

The volume average particle diameter of the magnetic toner was measured by "Coulter Counter TA-II" (manufactured by Coulter Electronics Co).

Falling-off percentage of particles from surfaces of toner particles

The falling-off of the magnetic iron oxide particles from surfaces of magnetic toner particles was evaluated in the following manner.

That is, 80 parts by weight of the magnetic iron oxide particles and 100 parts by weight of a styrene-acrylic resin were mixed and kneaded together to obtain a mixture. The obtained mixture was pulverized to prepare kneaded mixture particles having an average particle diameter of 10±2 μm. 1 g of the kneaded mixture particles were filled into a 30 cc glass bottle and shaken for 60 minutes by a paint shaker. The number of the fallen-off magnetic particles were measured by an electron microscope and the evaluation was made based on the comparison of the measured value (number) with that of fallen-off spherical magnetite particles having an average particle diameter of 0.2 μm and a sphericity (minor diameter/major diameter) of more than 0.8. It was required that the falling-off particle number percentage of the magnetic iron oxide particles was not more than 50% by particle number based on the number of the above-mentioned spherical magnetite particles fallen-off from the kneaded mixture particles containing the above-mentioned spherical magnetite particles after shaking, when measured by a scanning electron microscope "S-800" (manufactured by Hitach Ltd.).

<Production of Magnetic Iron Oxide Particles>

EXAMPLE 1

21.0 liters of an aqueous ferrous sulfate solution containing 1.6 mol/liter of $Fe^{2+}$ was added to 20.7 liters of a 3.1N aqueous sodium hydroxide solution (corresponding to 0.95 equivalent based on $Fe^{2+}$) previously charged into a reactor at a pH of 6.7 and a temperature of 90° C. to prepare an aqueous ferrous salt suspension containing a ferrous hydroxide colloid. Thereafter, air was passed into the suspension at a flow rate of 80 liters/minute to initiate a first stage reaction. Simultaneously, 0.3 liter of a water-diluted solution containing 196.3 g of No. 3 water glass as a silicon component ($SiO_2$: 28.8 wt %; corresponding to 4.5 atomic %, calculated as an element Si, based on Fe) was dropped into the suspension at a rate of 5 ml/minute ( corresponding to 1.67 wt %/minutes). After completing the dropping of the water glass solution, the oxidation reaction was further continued while stirring for 30 minutes, and then the first stage reaction was terminated so that a ferrous iron suspension containing magnetite core particles was produced.

After the initiation of the oxidation reaction in the first stage reaction, the pH of the suspension was in the range of 7.5 to 9.5 when the degree of oxidation of $Fe^{2+}$ was not less than 20%, and especially the pH of the suspension was in the range of 8.0 to 9.5 when the degree of oxidation of $Fe^{2+}$ was not less than 30%.

After completion of the first stage reaction, 0.4 liter of a 9N aqueous sodium hydroxide solution was added to the ferrous salt suspension containing the magnetite core particles to adjust the pH of the suspension to 9.5. Thereafter, air was passed into the resultant suspension at 90° C. and a flow rate of 100 liters/minute for 30 minutes to conduct a second stage reaction so that magnetite particles were prepared.

The thus-prepared magnetite particles were in turn washed with water, filtered, dried and pulverized by ordinary methods.

As clearly seen from the photomicrograph (×50,000) obtained by a transmission-type electron microscope as shown in FIG. 1, the resultant magnetite particles were of substantially a granular shape having a plurality of mountain-shaped protrusions with unsharpened crests on a surface of each particle, and had uniform particle sizes. The average particle diameter of the magnetite particles was 0.20 μm.

The protrusions formed on a surface of each magnetite particle were examined with respect to whether the aforementioned requirements (1) to (3) were satisfied. As a result, it was determined that the percentage of the number of the magnetite particles each having 2 to 30 protrusions satisfying the requirements (1) to (3) on the surface of each particle relative to a whole number of magnetite particles examined, was 76%. The average particle diameter of the magnetic iron oxide particles was 0.20 μm and the BET specific surface area thereof was 10.4 $m^2/g$.

Further, as a result of analysis of the fluorescent X-ray spectroscopy, the magnetite particles contained 3.7 atomic % of Si based on Fe and the amount of Si present on the surfaces thereof was 0.19 atomic %. Furthermore, as a result of analysis of the oxidation-reduction titration, the amount of $Fe^{2+}$ was 18.4% by weight and, therefore, the magnetite particles had a sufficient blackness. The saturation magnetization of the magnetite particles was 88.7 emu/g. In addition, from the result of the measurement of the compaction degree, the magnetite particles had an excellent fluidity. The magnetite particles also exhibited a charged amount of −18.0 μC/g an oil absorption of 20 ml/100 g and an exothermic reaction-initiation temperature of 131° C.

Next, the above-prepared magnetite particles were mixed and kneaded with a styrene-acrylic resin as the same as the above. The kneaded mixture was then pulverized to obtain kneaded mixture particles. The thus-obtained kneaded mixture particles were evaluated with respect to the falling-off property of the magnetite particles from surfaces of the kneaded mixture particles. As a result, it was determined that the magnetic particles exhibited a sufficient effect of preventing the falling-off thereof from the surfaces of the kneaded mixture particles. The falling-off percentage thereof was 30% by particle number.

EXAMPLE 2

21.0 liters of an aqueous ferrous sulfate solution containing 1.6 mol/liter of $Fe^{2+}$ was added to 20.7 liters of a 3.1N aqueous sodium hydroxide solution (corresponding to 0.95 equivalent based on $Fe^{2+}$) previously charged into a reactor at a pH of 6.7 and a temperature of 90° C. to prepare an aqueous ferrous salt suspension containing a ferrous hydroxide colloid. Thereafter, air was passed into the suspension at a flow rate of 80 liters/minute to initiate a first stage reaction. Simultaneously, 0.3 liter of a water-diluted solution containing 196.3 g of No. 3 water glass as a silicon component ($SiO_2$: 28.8 wt %; corresponding to 4.5 atomic %, calculated as an element Si, based on Fe) was dropped into the suspension such a manner that 0.06 liter of the water glass solution was added to the suspension 5 times every 10 minutes. After completing the dropping of the water glass solution, the oxidation reaction was further continued while stirring for 30 minutes, and then the first stage reaction was terminated so that a ferrous iron suspension containing magnetite core particles was obtained.

After the initiation of the oxidation reaction the first stage reaction, the pH of the suspension was in the range of 7.5 to 9.5 when the degree of oxidation of $Fe^{2+}$ was not less than 20%, and especially the pH of the suspension was in the range of 8.0 to 9.5 when the degree of oxidation of $Fe^{2+}$ was not less than 30%.

After completion of the first stage reaction, 0.4 liter of a 9N aqueous sodium hydroxide solution was added to the ferrous salt suspension containing the magnetite core particles to adjust the pH of the suspension to 9.5. Thereafter, air was passed into the resultant suspension at 90° C. and a flow rate of 100 liters/minute for 30 minutes to conduct a second stage reaction so that magnetite particles were prepared.

The thus-obtained magnetite particles were in turn washed with water, filtered, dried and pulverized by ordinary methods.

The resultant magnetite particles were of substantially a granular shape having a plurality of mountain-shaped protrusions with unsharpened crests on a surface of each particle, and had uniform particle sizes. The average particle diameter of the magnetite particles was 0.19 µm.

The protrusions formed on the surface of each magnetite particle were examined with respect to whether the aforementioned requirements (1) to (3) were satisfied. As a result, it was determined that the percentage of the number of the magnetite particles each having 2 to 30 protrusions satisfying the requirements (1) to (3) on the surface of each particle relative to a whole number of magnetite particles examined, was 81%. The average particle diameter of the magnetic iron oxide particles was 0.19 µm and the BET specific surface area thereof was 10.9 $m^2/g$.

Further, as a result of analysis of the fluorescent X-ray spectroscopy, the magnetite particles contained 3.7 atomic % of Si based on Fe and the amount of Si present on the surfaces thereof was 0.21 atomic %. Furthermore, as a result of analysis of the oxidation-reduction titration, the amount of $Fe^{2+}$ was 18.2% by weight and, therefore, the magnetite particles had a sufficient blackness. The saturation magnetization was 88.0 emu/g. In addition, from the result of the measurement of the compaction degree, the magnetite particles had an excellent fluidity. The magnetite particles also exhibited a charged amount of –20.0 µC/g, an oil absorption of 21 ml/100 g and an exothermic reaction-initiation temperature of 134° C.

Next, the above-prepared magnetite particles were mixed and kneaded with a styrene-acrylic resin as the same as the above. The kneaded mixture was then pulverized to obtain kneaded mixture particles. The thus-obtained kneaded mixture particles were evaluated with respect to the falling-off property of the magnetic particles from surfaces of the kneaded mixture particles. As a result, it was determined that the magnetic particles exhibited a sufficient effect of preventing the falling-off thereof from the surfaces of the kneaded mixture particles. The falling-off percentage thereof was 25% by particle number.

EXAMPLES 3 to 4 and Comparative Examples 1 to 7

The same procedures as defined in Example 2 were conducted to produce magnetite particles except that kinds, concentrations and amounts of the aqueous ferrous salt solution, kinds and concentrations of the aqueous alkali hydroxide solution, methods for adding the water glass and amounts thereof, and the pH values to be adjusted, which all were used in the first stage reaction, and kinds of the aqueous alkali hydroxide solution and the reaction temperatures used in the second stage reaction, were variously changed to those shown in Table 1.

The main production conditions used are shown in Table 1 and various properties or characteristics of the resultant magnetite particles are shown in Table 2.

TABLE 1

| Example and Comparative Example | Conditions for production of magnetic iron oxide particles First stage reaction | | |
|---|---|---|---|
| | Ferrous salt solution | Alkali hydroxide | Equivalent ratio (2 OH/Fe) |
| Example 2 | Ferrous sulfate | Sodium hydroxide | 0.95 |
| Example 3 | Ferrous sulfate | Sodium hydroxide | 0.95 |
| Example 4 | Ferrous sulfate | Sodium hydroxide | 0.95 |
| Comparative Example 1 | Ferrous sulfate | Sodium hydroxide | 0.99 |
| Comparative Example 2 | Ferrous sulfate | Sodium hydroxide | 0.90 |
| Comparative Example 3 | Ferrous sulfate | Sodium hydroxide | 0.95 |
| Comparative Example 4 | Ferrous sulfate | Sodium hydroxide | 0.95 |
| Comparative Example 5 | Ferrous sulfate | Sodium hydroxide | 0.95 |
| Comparative Example 6 | Ferrous sulfate | Sodium hydroxide | 0.95 |
| Comparative Example 7 | Ferrous sulfate | Sodium hydroxide | 0.95 |

TABLE 1-continued

Conditions for production of magnetic iron oxide particles
First stage reaction
Addition of Si

| Example and Comparative Example | Water-soluble silicate | Amount of Si added: Si/Fe (atomic %) | Timing of addition of Si | Adding rate (wt %/min) | Adding method |
|---|---|---|---|---|---|
| Example 2 | Water glass No. 3 | 4.5 | Upon initiation of reaction and subsequently every 10 minutes | — | in batch manner in five parts |
| Example 3 | Water glass No.3 | 3.0 | At 5%/min from initiation of reaction | 2.0 | continuously dropped |
| Example 4 | Water glass No.3 | 6.0 | At 5%/min from initiation of reaction | 1.33 | continuously dropped |
| Comparative Example 1 | Water glass No.3 | 0.3 | At 5%/min from initiation of reaction | 1.67 | continuously dropped |
| Comparative Example 2 | Water glass No.3 | 9.0 | At 5%/min from initiation of reaction | 1.67 | continuously dropped |
| Comparative Example 3 | Water glass No.3 | 4.5 | Immediately after initiation of reaction | — | charged at one time |
| Comparative Example 4 | Water glass No.3 | 4.5 | At 5%/min from initiation of reaction | 1.67 | continuously dropped |
| Comparative Example 5 | Water glass No.3 | 4.5 | At 5%/min from initiation of reaction | 1.67 | continuously dropped |
| Comparative Example 6 | Water glass No.3 | 4.5 | At 5%/min from initiation of reaction | 1.67 | continuously dropped |
| Comparative Example 7 | Water glass No.3 | 4.5 | Upon charging | — | charged at one time |

Conditions for production of magnetic iron oxide particles

| | First stage reaction | | | Second stage reaction | | |
|---|---|---|---|---|---|---|
| | pH adjustment | | | | | |
| Example and Comparative Example | pH range | Timing of adjustment of pH by Degree of Oxidation (%) | Reaction temperature (°C.) | Alkali hydroxide | Equivalent ratio based on residual $Fe^{2+}$ (2 OH/Fe) | Reaction temperature (°C.) |
| Example 2 | 8.0–9.5 | on and after reaching 30% | 90 | Sodium hydroxide | 1.1 | 90 |
| Example 3 | 8.0–9.5 | on and after reaching 30% | 95 | Sodium hydroxide | 1.05 | 95 |
| Example 4 | 8.0–9.5 | on and after reaching 30% | 85 | Sodium hydroxide | 1.2 | 85 |
| Comparative Example 1 | 8.0–9.5 | on and after reaching 30% | 90 | Sodium hydroxide | 1.1 | 90 |
| Comparative Example 2 | 8.0–9.5 | on and after reaching 30% | 90 | Sodium hydroxide | 1.1 | 90 |
| Comparative | 8.0–9.5 | on and | 90 | Sodium | 1.1 | 90 |

TABLE 1-continued

| | | | | | | |
|---|---|---|---|---|---|---|
| Example 3 | | after reaching 30% | | hydroxide | | |
| Comparative Example 4 | 6.7–7.5 | on and after reaching 30% | 90 | Sodium hydroxide | 1.1 | 90 |
| Comparative Example 5 | 9.5–10.0 | on and after reaching 30% | 90 | Sodium hydroxide | 1.1 | 90 |
| Comparative Example 6 | 8.0–9.5 | on and after reaching 30% | 90 | Sodium hydroxide | 1.1 | 90 |
| Comparative Example 7 | 8.0–9.5 | on and after reaching 30% | 90 | Sodium hydroxide | 1.1 | 90 |

TABLE 2

| Example and Comparative Example | Average particle diameter (μm) | BET specific surface area (m²/g) | Shape of particles | Percentage of particles having 2 to 30 protrusions (%) | Content of $Fe^{2+}$ (wt %) |
|---|---|---|---|---|---|
| Example 2 | 0.19 | 11.3 | Granular shape having mountain-shaped protrusions with unsharpened crests | 81 | 18.2 |
| Example 3 | 0.20 | 9.8 | Granular shape having mountain-shaped protrusions with unsharpened crests | 78 | 18.9 |
| Example 4 | 0.18 | 16.0 | Granular shape having mountain-shaped protrusions with unsharpened crests | 64 | 17.5 |
| Comparative Example 1 | 0.19 | 7.1 | Hexahedral | 15 | 19.2 |
| Comparative Example 2 | 0.20 | 27.5 | Spherical | 46 | 16.8 |
| Comparative Example 3 | 0.18 | 20.4 | Spherical | 41 | 17.7 |
| Comparative Example 4 | 0.19 | 15.7 | Spherical | 18 | 18.0 |
| Comparative Example 5 | 0.20 | 10.6 | Octahedral | 54 | 18.6 |
| Comparative Example 6 | 0.20 | 11.1 | Octahedral | 47 | 18.3 |
| Comparative Example 7 | 0.19 | 18.9 | Spherical | 36 | 17.4 |

| Example and Comparative Example | Content of Si (Si/Fe: atomic %) | Content of Si on surfaces of particles (Si/Fe: atomic %) | Saturation magnetization (emu/g) | Charged amount (μC/g) | Fluidity (*) | Amount of powder fallen off from resin mixture particles | Falling-off percentage (% by particle number) |
|---|---|---|---|---|---|---|---|
| Example 2 | 3.7 | 0.21 | 88.0 | −20 | ○ | little | 25 |
| Example 3 | 1.2 | 0.12 | 89.1 | −12 | ○ | little | 30 |
| Example 4 | 5.3 | 0.46 | 85.8 | −31 | ○ | little | 35 |
| Comparative Example 1 | 0.5 | 0.0 | 89.6 | −8 | Δ | small | 60 |
| Comparative Example 2 | 9.0 | 1.37 | 83.5 | −43 | ○ | large | 65 |
| Comparative | 3.6 | 0.50 | 85.7 | −30 | ○ | large | 75 |

TABLE 2-continued

| | | | | | | | |
|---|---|---|---|---|---|---|---|
| Example 3 | | | | | | | |
| Comparative Example 4 | 3.7 | 0.36 | 87.4 | −24 | ○ | large | 85 |
| Comparative Example 5 | 3.8 | 0.03 | 88.7 | −10 | x | small | 65 |
| Comparative Example 6 | 3.8 | 0.01 | 88.5 | −9 | x | small | 75 |
| Comparative Example 7 | 3.6 | 0.46 | 86.6 | −26 | ○ | large | 80 |

Note:
(*)Ratings of fluidity: (evaluated by measured values of compaction degree)
○: less than 40;
Δ: between 40 to 50; and
x: more than 50

Figure 3:
FIG. 3 is an electron photomicrograph (×50,000) of magnetite particles obtained in Comparative Example 1.
Figure 4:
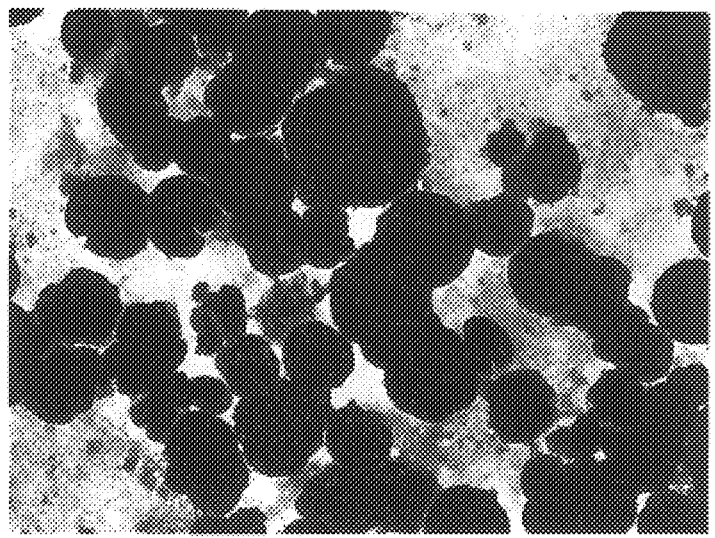
FIG. 4 is an electron photomicrograph (×50,000) of magnetite particles obtained in Comparative Example 2.
Figure 5:
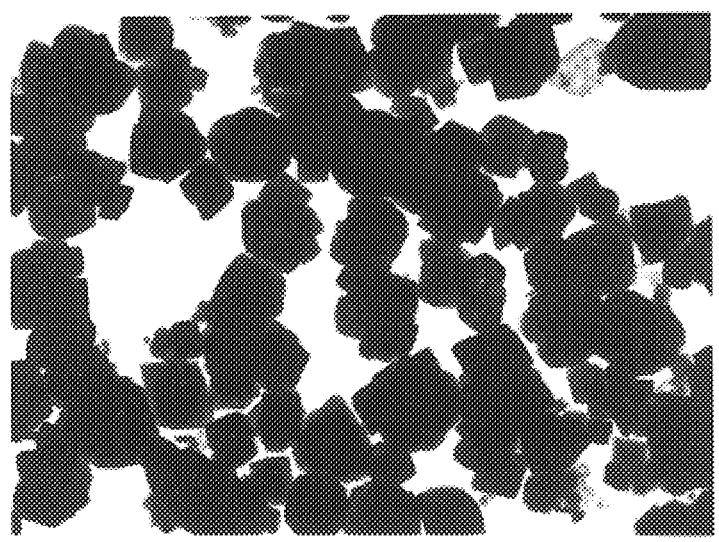
FIG. 5 is an electron photomicrograph (×50,000) of magnetite particles obtained in Comparative Example 5.

As clearly seen from the photomicrograph (×50,000) as shown in FIG. 3, the magnetite particles obtained in Comparative Example 1 had a hexahedral shape and were deteriorated in effects of preventing the falling-off of the magnetite particles from the surfaces of the kneaded mixture particles as compared to the magnetite particles obtained in Example 2. Also, the magnetite particles of Comparative Example 1 contained a reduced amount of Si on the surfaces thereof, and therefore exhibited a deteriorated fluidity.

<Deposition Treatment>

EXAMPLE 5

1 kg of the magnetite particles obtained in Example 1 were dispersed in water maintained at 80° C. Thereafter, an aqueous sodium hydroxide solution was dropped into the thus-obtained suspension while stirring to adjust a pH of the suspension to 11. Next, an aqueous solution containing 12.7 g of aluminum sulfate (0.20% by weight, calculated as an element Al, based on the weight of the particles) was dropped into the suspension, and then 3.6N-sulfuric acid was dropped thereto, so that the pH of the suspension was adjusted to 5, followed by stirring the suspension for 5 minutes. Successively, an aqueous sodium hydroxide solution was dropped into the suspension to adjust the pH thereof to 7 and then the dispersion was further stirred for 30 minutes. Thereafter, the thus prepared particles were was filtered, washed with water and then dried at 60° C. to obtain magnetite particles on surfaces of which aluminum hydroxide was deposited.

The thus-prepared magnetite particles on the surfaces of which aluminum hydroxide was deposited, had a BET specific surface area of 10.6 m²/g, a saturation magnetization of 88.2 emu/g, an aluminum content on the surfaces thereof of 0.18% by weight, an oil absorption of 20 ml/100 g and an exothermic reaction-initiation temperature of 158° C.

Further, the thus-prepared magnetite particles on the surfaces of which aluminum hydroxide was deposited, were of substantially a granular shape having a plurality of mountain-shaped protrusions with unsharpened crests on the surface of each particle. The falling-off property of the magnetite particles from surfaces of the kneaded mixture particles was examined in the same manner as defined above, so that it was determined that the magnetite particles exhibited a sufficient effect of preventing the falling-off thereof from surfaces of the kneaded mixture particles. Further, it was determined that the magnetite particles exhibited an excellent fluidity. The falling-off percentage thereof was 35% by particle number.

EXAMPLE 6

1 kg of the magnetite particles obtained in Example 2 were dispersed in water maintained at 80° C. Thereafter, an aqueous sodium hydroxide solution was dropped into the suspension while stirring to adjust a pH of the suspension to 11. Next, an aqueous solution containing 63.4 g of aluminum sulfate (1.00% by weight, calculated as an element Al, based on the weight of the particles) was dropped into the suspension, and 3.6N-sulfuric acid was dropped thereinto, so that the pH of the suspension was adjusted to 7, followed by stirring the suspension for 30 minutes. Thereafter, the thus prepared particles were filtered, washed with water and then dried at 60° C. to obtain magnetite particles on surfaces of which aluminum hydroxide was deposited. Various properties of the resultant magnetite particles are shown in Table 3.

EXAMPLES 7 to 10 and Comparative Examples 8 to 9

The same procedures as defined in Example 6 were conducted for the deposition treatment except that kinds and amounts of the particles to be treated and kinds and amounts of materials to be deposited on the particles were changed variously. The conditions of the deposition treatment and various properties of the resultant magnetite particles are also shown in Table 3.

TABLE 3

| | Deposition treatment by metal oxide or metal hydrous oxide | | | |
|---|---|---|---|---|
| | Particles to be treated | | | |
| Example and Comparative Example | Kind | Exothermic reaction-initiation temperature (°C.) | Material deposited | |
| | | | Kind | Amount added (wt %) |
| Example 6 | Magnetite particles of Example 2 before surface treatment | 134 | Aluminum sulfate | Al: 1.0 |
| Example 7 | Magnetite particles of Example 2 before surface treatment | 134 | Aluminum sulfate | Al: 2.5 |
| Example 8 | Magnetite particles of Example 3 before surface treatment | 127 | Titanyl sulfate | Ti: 1.5 |
| Example 9 | Magnetite particles of Example 4 | 158 | Titanyl sulfate | Ti: 1.0 |

TABLE 3-continued

|  |  |  |  |  |
|---|---|---|---|---|
| Example 10 | Magnetite particles of Example 2 before surface treatment | 134 | Magnesium sulfate | Mg: 0.20 |
| Comparative Example 8 | Magnetite particles of Example 2 before surface treatment | 134 | Aluminum sulfate | Al: 0.02 |
| Comparative Example 9 | Magnetite particles of Example 2 before surface treatment | 134 | Aluminum sulfate | Al: 20.0 |

Properties of magnetite particles after deposition treatment

| Example and Comparative Example | Average particle diameter ($\mu$m) | BET specific surface area ($m^2/g$) | Content of Si (Si/Fe: atomic %) | Saturation magnetization (emu/g) |
|---|---|---|---|---|
| Example 6 | 0.19 | 12.0 | 3.7 | 87.0 |
| Example 7 | 0.20 | 12.4 | 3.6 | 85.4 |
| Example 8 | 0.20 | 10.5 | 1.2 | 87.5 |
| Example 9 | 0.18 | 16.8 | 5.3 | 86.3 |
| Example 10 | 0.19 | 11.6 | 3.7 | 86.9 |
| Comparative Example 8 | 0.19 | 11.2 | 3.7 | 87.8 |
| Comparative Example 9 | 0.22 | 25.6 | 3.2 | 72.6 |

Properties of magnetite particles after deposition treatment

| Example and Comparative Example | Kind and amount of material deposited (wt %) | Oil absorption (ml/100 g) | Threshold temperature of exothermic reaction (°C.) |
|---|---|---|---|
| Example 6 | Al: 0.89 | 21 | 221 |
| Example 7 | Al: 2.1 | 22 | 287 |
| Example 8 | Ti: 1.37 | 20 | 245 |
| Example 9 | Ti: 0.92 | 23 | 252 |
| Example 10 | Mg: 0.17 | 21 | 154 |
| Comparative Example 8 | Al: 0.01 | 21 | 138 |
| Comparative Example 9 | Al: 18.2 | 25 | 312 |

<Hydrophobic Treatment>

EXAMPLE 11

10 kg of the magnetite particles obtained in Example 1 and 15 g of a silane-based coupling agent "A-143" (produced by Nippon Unica Co., Ltd.) were charged into a wheel-type kneader (tradename: "SANDMILL" manufactured by Matsumoto Chuzo Tekkosho Co., Ltd.), the wheel-type kneader was operated for one hour to obtain magnetite particles on surfaces of which the silane-based coupling agent was deposited. The conditions for the hydrophobic treatment and various properties of the resultant magnetite particles are shown in Table 4.

EXAMPLES 12 to 17 and Comparative Examples 10 to 11

The same procedures as defined in Example 11 were conducted for the hydrophobic treatment except that kinds and amounts of the particles to be treated and kinds and amounts of the hydrophobic treatment agents deposited on the particles were changed variously. The conditions for the hydrophobic treatment and various properties of the resultant magnetic iron oxide particles are also shown in Table 4.

TABLE 4

Hydrophobic treatment

| Example and Comparative Example | Particles to be treated | | Hydrophobic treatment agent | |
|---|---|---|---|---|
| | Kind | Oil absorption (ml/100 g) | Kind | Amount added (wt %) |
| Example 11 | Magnetite particles of Example 1 before surface treatment | 20 | Silane-based coupling agent A-143 | 0.20 |
| Example 12 | Magnetite particles of Example 2 before surface treatment | 21 | Silane-based coupling agent A-143 | 2.5 |
| Example 13 | Magnetite particles of Example 3 before surface treatment | 18 | Silane-based coupling agent A-143 | 4.0 |
| Example 14 | Magnetite particles of Example 2 before surface treatment | 21 | Titanate-based coupling agent BRENACT-TTS | 2.0 |
| Example 15 | Magnetite particles of Example 3 before surface treatment | 18 | Titanate-based coupling agent BRENACT-TTS | 4.5 |
| Example 16 | Magnetite particles of Example 4 before surface treatment | 22 | Iso-palmitic acid (Nissan Kagaku Co., Ltd.) | 0.15 |
| Example 17 | Magnetite particles of Example 1 before surface treatment | 20 | Iso-palmitic acid (Nissan Kagaku Co., Ltd.) | 2.5 |
| Comparative Example 10 | Magnetite particles of Example 2 before surface treatment | 21 | Silane-based coupling agent A-143 | 0.05 |
| Comparative Example 11 | Magnetite particles of Example 2 before surface treatment | 21 | Titanate-based coupling agent BRENACT-TTS | 15.0 |

Properties of magnetite particles after hydrophobic treatment

| Example and Comparative Example | Average particle diameter ($\mu$m) | BET specific surface area ($m^2/g$) | Content of Si (Si/Fe: atomic %) | Saturation magnetization (emu/g) |
|---|---|---|---|---|
| Example 11 | 0.20 | 10.2 | 3.7 | 88.3 |
| Example 12 | 0.19 | 10.0 | 4.0 | 86.4 |
| Example 13 | 0.20 | 7.9 | 1.7 | 86.8 |
| Example 14 | 0.19 | 9.2 | 3.6 | 85.9 |
| Example 15 | 0.20 | 7.2 | 1.2 | 84.8 |
| Example 16 | 0.18 | 15.6 | 5.3 | 85.1 |
| Example 17 | 0.20 | 7.8 | 3.6 | 86.2 |
| Comparative Example 10 | 0.19 | 11.4 | 3.7 | 87.8 |
| Comparative Example 11 | 0.19 | 6.3 | 3.3 | 76.2 |

Properties of magnetite particles after hydrophobic treatment

| Example and Comparative Example | Amount of hydrophobic treatment agent deposited | | Oil absorption (ml/100 g) |
|---|---|---|---|
| | Amount of carbon (wt %) | Depositied amount calculated from amount of C (wt %) | |
| Example 11 | 0.04 | 0.12 | 18 |
| Example 12 | 0.45 | 1.32 | 17 |
| Example 13 | 0.72 | 2.11 | 14 |
| Example 14 | 1.36 | 1.88 | 17 |
| Example 15 | 3.05 | 4.22 | 14 |
| Example 16 | 0.11 | 0.14 | 20 |
| Example 17 | 1.88 | 2.34 | 16 |

TABLE 4-continued

| Comparative Example 10 | 0.01 | 0.03 | 21 |
| Comparative Example 11 | 10.17 | 14.08 | 13 |

<Deposition Treatment and Hydrophobic Treatment>

Example 18

10 kg of the magnetite particles obtained in Example 5, on surfaces of which aluminum hydroxide was deposited, and 20 g of a silane-based coupling agent "A-143" (produced by Nippon Unica Co., Ltd.) were charged into a wheel-type kneader (tradename: "SANDMILL" manufactured by Matsumoto Chuzo Tekkosho Co., Ltd.), and mixed for one hour so that magnetite particles on surfaces of which both aluminum hydroxide and the silane-based coupling agent were in turn deposited, were obtained. The conditions for the deposition and hydrophobic treatments and various properties of the resultant magnetite particles are shown in Table 5.

EXAMPLES 19 to 24

The same procedures as defined in Example 18 were conducted for the deposition and hydrophobic treatments except that kinds of particles on surfaces of which the oxide or the like of the specified element was deposited, and kinds and amounts of the hydrophobic treatment agents used were changed variously. The conditions for the deposition and hydrophobic treatments and various properties of the resultant magnetic iron oxide particles are also shown in Table 5.

TABLE 5

| | Hydrophobic treatment | | | | |
|---|---|---|---|---|---|
| | Particles to be treated | | | Hydrophobic treatment agent | |
| Example and Comparative Example | Kind | Oil absorption (ml/100 g) | Exothermic reaction-initiation temperature (°C.) | Kind | Amount added (wt %) |
| Example 18 | Magnetite particles of Example 5 after deposition treatment | 20 | 158 | Silane-based coupling agent A-143 | 0.2 |
| Example 19 | Magnetite particles of Example 5 after deposition treatment | 20 | 158 | Silane-based coupling agent A-143 | 3.5 |
| Example 20 | Magnetite particles of Example 6 after deposition treatment | 21 | 221 | Silane-based coupling agent A-143 | 3.0 |
| Example 21 | Magnetite particles of Example 5 after deposition treatment | 20 | 158 | Titanate-based coupling agent BRENACT-TTS | 2.0 |
| Example 22 | Magnetite particles of Example 6 after deposition treatment | 21 | 221 | Titanate-based coupling agent BRENACT-TTS | 2.5 |
| Example 23 | Magnetite particles of Example 8 after deposition treatment | 20 | 245 | Silane-based coupling agent A-143 | 1.5 |
| Example 24 | Magnetite particles of Example 8 after deposition treatment | 20 | 245 | Titanate-based coupling agent BRENACT-TTS | 3.0 |

| Example and Comparative Example | Properties of magnetite particles after hydrophobic treatment | | | |
|---|---|---|---|---|
| | Average particle diameter (μm) | BET specific surface area (m$^2$/g) | Content of Si (Si/Fe: atomic %) | Saturation magnetization (emu/g) |
| Example 18 | 0.20 | 10.4 | 3.7 | 87.8 |
| Example 19 | 0.20 | 9.2 | 4.1 | 86.3 |
| Example 20 | 0.19 | 10.2 | 4.0 | 85.2 |
| Example 21 | 0.20 | 8.6 | 3.6 | 86.3 |

TABLE 5-continued

| Example 22 | 0.19 | 9.8 | 3.6 | 84.2 |
| Example 23 | 0.20 | 9.3 | 1.4 | 86.5 |
| Example 24 | 0.20 | 7.7 | 1.2 | 84.5 |

Properties of magnetite particles after hydrophobic treatment

| Example and Comparative Example | Amount of hydrophobic treatment agent deposited | | Oil absorption (ml/100 g) | Threshold temperature of exothermic reaction (°C.) |
| --- | --- | --- | --- | --- |
| | Amount of carbon (wt %) | Deposited amount calculated from amount of C (wt %) | | |
| Example 18 | 0.04 | 0.12 | 18 | 170 |
| Example 19 | 0.63 | 1.85 | 15 | 211 |
| Example 20 | 0.54 | 1.58 | 16 | 258 |
| Example 21 | 1.36 | 1.88 | 16 | 203 |
| Example 22 | 1.70 | 2.35 | 17 | 286 |
| Example 23 | 0.27 | 0.79 | 17 | 288 |
| Example 24 | 2.03 | 2.81 | 16 | 294 |

<Production of Magnetic Toner>

EXAMPLES 25 to 26

(Toner Composition)

| | |
| --- | --- |
| Styrene-n-butyl acrylate copolymer (Copolymerization ratio = 85:15, Mw = 250,000, Tg = 62° C.) | 100 parts by weight |
| Magnetic iron oxide particles obtained in Example 1 or 5 | 80 parts by weight |
| Positive charge-controlling agent | 1.5 parts by weight |
| Low-molecular weight ethylene-propylene copolymer | 2 parts by weight |

The mixtures having the afore-mentioned compositions were respectively kneaded by a roll mill having a pair of rolls heated to 140° C., for 15 minutes. After cooling, the mixtures were subjected to coarse crushing and then pulverization to obtain particles. The obtained particles were classified to remove fine and coarse particle fractions therefrom. As a result, there were prepared two kinds of magnetic toners having a volume-average particle diameter of 10.4 $\mu$m, [a magnetic toner (Example 25) of which contained the magnetic iron oxide particles obtained in Example 1 and another magnetic toner (Example 26) of which contained those obtained in Example 5].

The thus-prepared magnetic toners were used to prepare two kinds of one component-system developers. The respective one component-system developers were examined as to the density of images produced, fogs formed on a background area of recording papers or the like. The magnetic toners were also subjected to a durability test including a shaking test by a paint shaker to examine whether any powder of the magnetic iron oxide particles were fallen off from the magnetic toner. As a result, it was determined that the magnetic toners obtained in Examples 25 and 26 produced images having a higher definition, and exhibited a higher durability without the falling-off of the magnetic iron oxide particles therefrom as compared to the magnetic toner using the conventional spherical magnetic iron oxide particles. The falling-off percentage thereof was 30% by particle number (Example 25) and 35% by particle number (Example 26).

What is claimed is:

1. Magnetite particles having an average particle diameter of 0.05 to 0.50 $\mu$m, each of said magnetite particles having a plurality of mountain-shaped protrusions with unsharpened crests on a surface of each particle, and the number of said mountain-shaped protrusions formed on the surface of each magnetite particle being in the range of 2 to 30 when viewed in projected plan, wherein the magnetite particles satisfy the formulae (I) and (II):

$$0.10 \leq x/z \leq 0.40 \tag{I}$$

$$0.05 \leq y/z \leq 0.30 \tag{II}$$

wherein x represents a bottom length of each of mountain-shaped protrusions, y represents a height each of mountain-shaped protrusions, and z represents an average particle diameter of the magnetite particle on which the mountain-shaped protrusions are present.

2. Magnetite particles according to claim 1, which have an oxide, a hydroxide or a hydrous oxide of at least one element selected from the group consisting of Al, Ti, Mg, Si, Co, Zr, Mn, Zn, and a mixture thereof deposited on surfaces of each particle.

3. Magnetite particles according to claim 2, wherein the amount of said at least one element deposited is in the range of 0.02 to 10% by weight, calculated as each element, based on the weight of the magnetite particles.

4. Magnetite particles according to claim 3, which have at least one hydrophobic treatment agent selected from the group consisting of a coupling agent, a silicone and a fatty acid having not less than 15 carbon atoms deposited on surface of each deposited particle.

5. Magnetite particles according to claim 4, wherein the amount of said at least one hydrophobic treatment agent deposited is in the range of 0.1 to 10.0% by weight based on the weight of the magnetite particles.

6. Magnetite particles according to claim 1, which have at least one hydrophobic treatment agent selected from the group consisting of a coupling agent, a silicone and a fatty acid having not less than 15 carbon atoms deposited on surface of each particle.

7. Magnetite particles according to claim 6, wherein the amount of said at least one hydrophobic treatment agent deposited is in the range of 0.1 to 10.0% by weight based on the weight of the magnetite particles.

8. Magnetic iron oxide particles for magnetic toner comprising not less than 60%, in number, of the magnetite particles according to claim 1, containing 0.9 to 6.5 atomic % of silicon, calculated as an element Si, based on Fe, and said magnetic iron oxide particles having an average particle diameter of 0.05 to 0.50 μm.

9. Magnetic iron oxide particles according to claim 8, which have an oxide, a hydroxide or a hydrous oxide of at least one element selected from the group consisting of Al, Ti, Mg, Si, Co, Zr, Mn, Zn, and a mixture thereof deposited on surfaces of each particle.

10. Magnetic iron oxide particles according to claim 9, wherein the amount of said at least one element deposited is in the range of 0.02 to 10% by weight, calculated as each element, based on the weight of the magnetic iron oxide particles.

11. Magnetic iron oxide particles according to claim 9, which have at least one hydrophobic treatment agent selected from the group consisting of a coupling agent, silicone and a fatty acid having not less than 15 carbon atoms deposited on surface of each deposited magnetic iron oxide particle.

12. Magnetic iron oxide particles according to claim 11, wherein the amount of said at least one hydrophobic treatment agent deposited is in the range of 0.1 to 10.0% by weight based on the weight of the magnetic iron oxide particles.

13. Magnetic iron oxide particles according to claim 8, which have at least one hydrophobic treatment agent selected from the group consisting of a coupling agent, silicone and a fatty acid having not less than 15 carbon atoms deposited on surface of each magnetic iron oxide particle.

14. Magnetic iron oxide particles according to claim 13, wherein the amount of said at least one hydrophobic treatment agent deposited is in the range of 0.1 to 10.0% by weight based on the weight of the magnetic iron oxide particles.

15. Magnetic iron oxide particles according to claim 13, wherein the oil absorption thereof is not more than 20 ml/100 g.

16. Magnetic iron oxide particles according to claim 8, wherein the BET specific surface area thereof is in the range of 3 to 30 $m^2/g$ and the saturation magnetization thereof is in the range of 80 to 92 emu/g.

17. Magnetic iron oxide particles for magnetic toner according to claim 8, wherein the content of $Fe^{2+}$ is in the range of 12 to 24% by weight, the compaction degree thereof is not more than 50, and the amount of electrostatic charge thereon is in the range of +20 to −60 μC/g.

* * * * *